United States Patent [19]
Testin

[11] Patent Number: 5,376,928
[45] Date of Patent: Dec. 27, 1994

[54] EXCHANGING DATA AND CLOCK LINES ON MULTIPLE FORMAT DATA BUSES

[75] Inventor: William J. Testin, Indianapolis, Ind.

[73] Assignee: Thomson Consumer Electronics, Inc., Indianapolis, Ind.

[21] Appl. No.: 947,669

[22] Filed: Sep. 18, 1992

[51] Int. Cl.⁵ .............................................. H04Q 1/00
[52] U.S. Cl. ................................... 340/825.5; 371/8.2
[58] Field of Search ............ 340/825.5, 825.2, 825.21; 370/95.1, 95.3, 58.1, 58.2, 55; 371/8.2, 11.2

[56] References Cited

U.S. PATENT DOCUMENTS

| | | | |
|---|---|---|---|
| 4,574,377 | 3/1986 | Miyazaki et al. | 370/95.3 |
| 4,792,950 | 12/1988 | Volk et al. | 371/8.2 |
| 4,827,471 | 5/1989 | Geiger et al. | 340/825.5 |
| 5,146,453 | 9/1992 | Nagler et al. | 370/58.1 |

FOREIGN PATENT DOCUMENTS

| | | | |
|---|---|---|---|
| 0258872 | 3/1988 | European Pat. Off. | G06F 13/42 |
| 0288713 | 11/1988 | European Pat. Off. | G06F 13/12 |
| WO85/03147 | 7/1985 | WIPO | G06F 3/04 |

OTHER PUBLICATIONS

Philips, "I2C bus in consumer applications" pp. 1-8 (1983).
Intermetall Semiconductors ITT, "Digit 2000 VLSI Digital TV System" p. 17 (1983).

Primary Examiner—Douglas W. Olms
Assistant Examiner—Shick Hom
Attorney, Agent, or Firm—Joseph S. Tripoli; Peter M. Emanuel; Robert D. Shedd

[57] ABSTRACT

A bus-controlled signal processing system includes a serial data bus having first and second bus lines for coupling various slave processors to a master control processor. The slave devices require more than one data bus protocol. Each slave device has a bus clock terminal and a bus data terminal. The slave devices dedicated to one protocol have their clock terminals connected to the first bus line and their data terminals connected to the second bus line. The slave devices dedicated to the other protocol have their data terminals connected to the first bus line and their clock terminals connected to the second bus line. The control processor changes the protocol being used to generate bus transmissions as required, and changes the function of the two bus lines when switching between bus protocols to prevent certain bus conflict conditions from occurring.

8 Claims, 5 Drawing Sheets

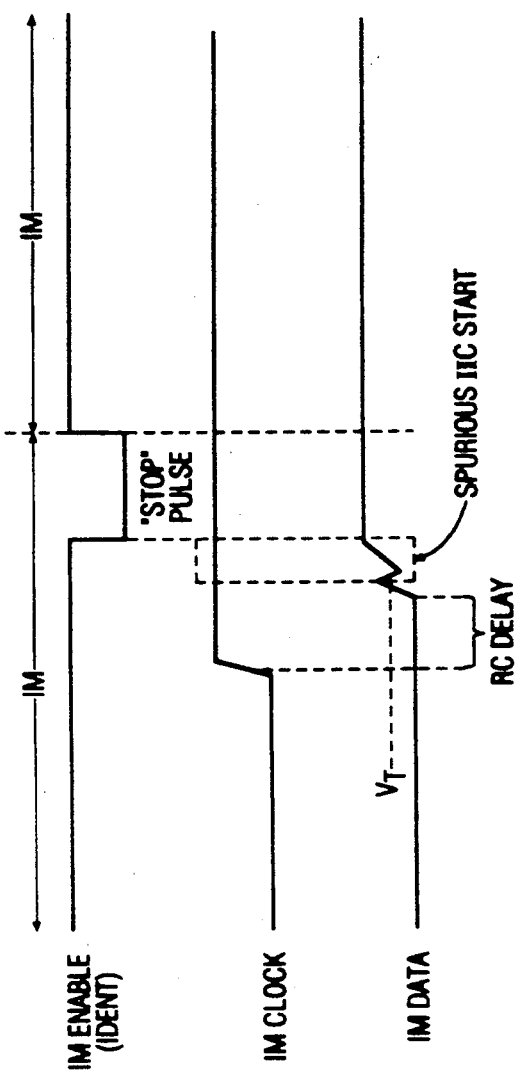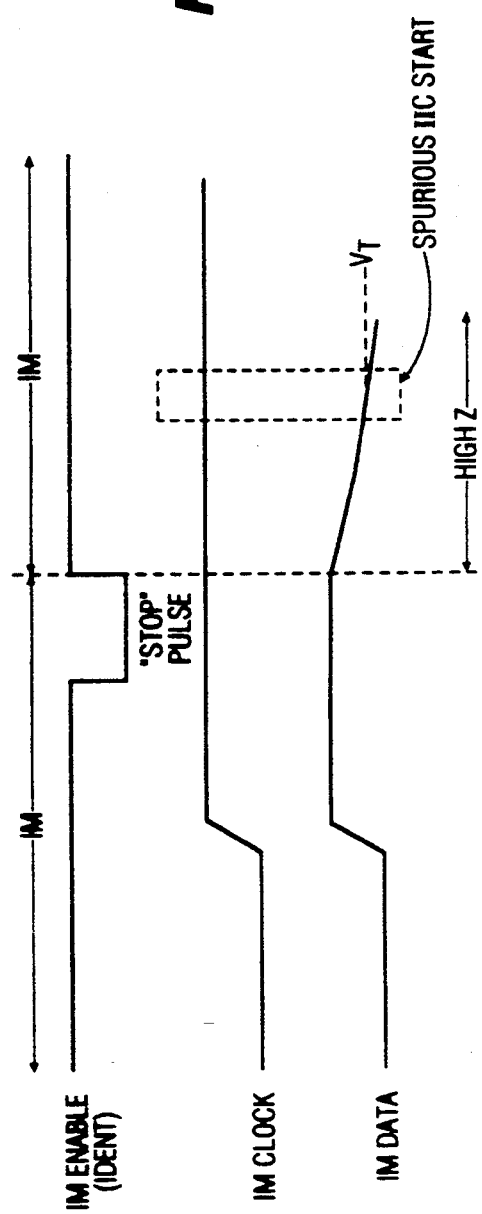

EXCHANGING DATA AND CLOCK LINES ON MULTIPLE FORMAT DATA BUSES

FIELD OF THE INVENTION

The present invention relates to bus-controlled signal processing systems.

BACKGROUND OF THE INVENTION

Signal processing systems may be implemented using a variety of integrated circuits controlled by one or more control microcomputers ($\mu$C). Communications between the various functions typically involves a data bus such as a serial data bus. To incorporate all desired functions in a bus-controlled signal processing system, it may be necessary to utilize signal processing integrated circuits (IC) from various manufacturers. However, manufacturers support several different communications protocols. For example, Philips and ITT support bus standards designated the Inter IC (IIC or I2C), and Intermetall (IM) standards, respectively.

Use of multiple communications protocols on a single data bus introduces the possibility that an integrated circuit (IC) dedicated to one protocol will misinterpret signals formatted under a different protocol. Bus standards specify signal patterns that indicate message start and end conditions, device address, and message data for devices coupled to the bus. For example, a particular transition occurring on one signal during a particular state on another signal indicates "start of message" for the IIC bus standard. Signal waveforms that are generated to conform to IM bus standard may inadvertently create the "start message" condition for the IIC bus. If both IM and IIC devices are connected to a bus, an IIC device may be activated unintentionally during an IM format message. As a result, two devices attempt to communicate simultaneously on the bus. Corruption of any transmission that is in progress and incorrect system operation may result.

The occurrence of the described bus conflicts will depend on data values and timing. Thus, the conflicts and any subsequent system malfunctions will be intermittent. Testing of the system may identify data patterns that should be avoided to prevent bus conflicts. However, exhaustive and lengthy testing of all possible data patterns may be required to ensure reliable system performance. In addition, it would be necessary to repeat the testing when a device type is changed or a new device is added to the bus.

SUMMARY OF THE INVENTION

In accordance with a feature of the invention, a data bus includes first and second bus lines for coupling first and second data processing devices to a control device. The first data processing device has clock and data terminals that are coupled to the first and second bus lines, respectively. The second data processing device has clock and data terminals that are coupled to the second and first bus lines, respectively. The control device generates clock and data signals on the first and second bus lines, respectively, during a first mode of operation to control the operation of the first data processing device without affecting the operation of the second data processing device. The control device generates clock and data signals on the second and first bus lines, respectively, during a second mode of operation to control the operation of the second data processing device without affecting the operation of the first data processing device.

BRIEF DESCRIPTION OF THE DRAWING

FIGS. 2, 3, 4A, and 4B show signal waveforms useful for understanding the operation of the embodiment shown in FIG. 1.

DETAILED DESCRIPTION OF THE DRAWING

Figure 1:
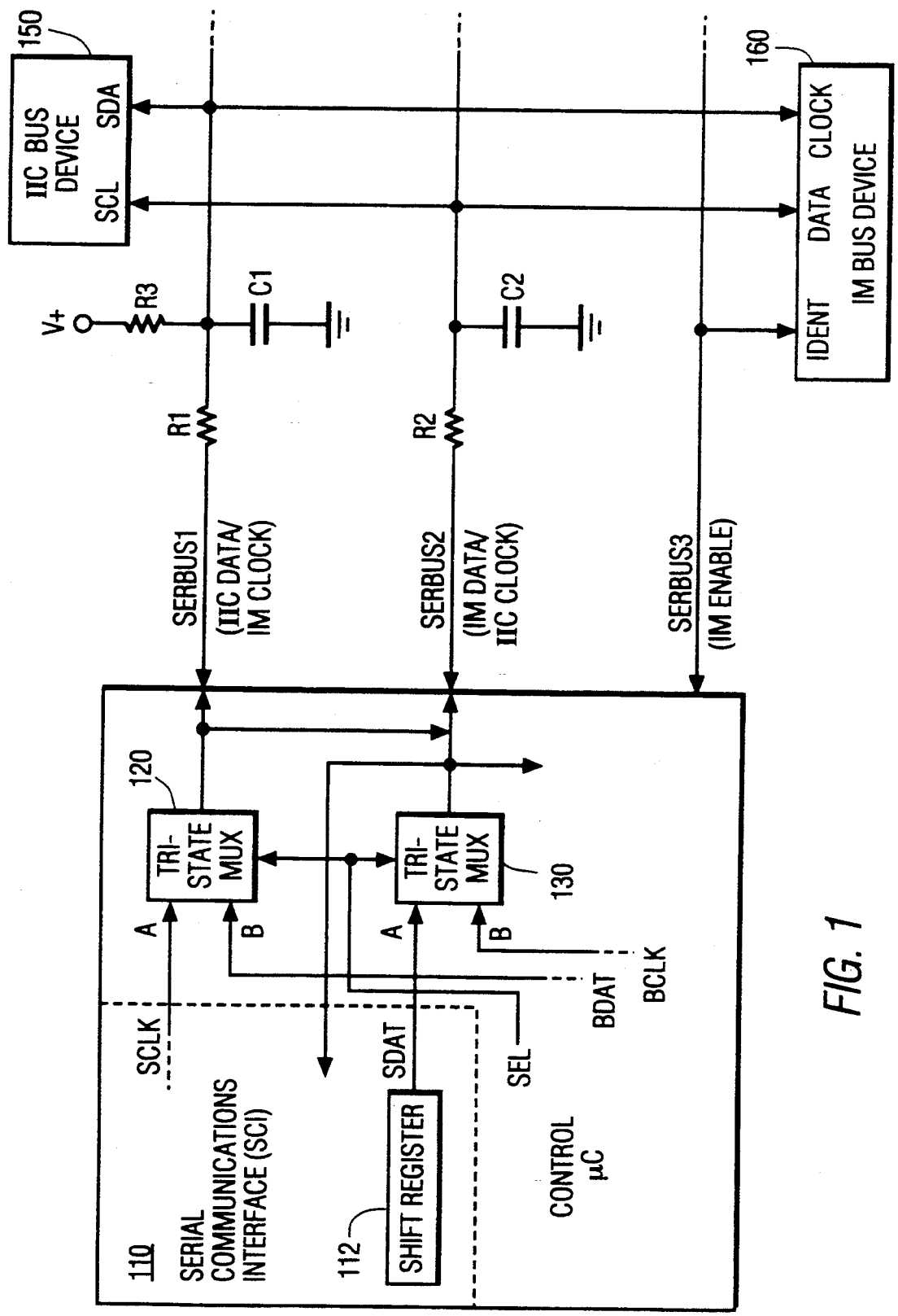
FIG. 1 shows a block diagram of a portion of a bus-controlled signal processing system that includes an embodiment of the invention.

FIG. 1 shows a portion of a bus-controlled signal processing system including control microcomputer ($\mu$C) 100 and devices 150 and 160. A serial data bus comprising signals SERBUS1, SERBUS2, and SERBUS3 couples $\mu$C 100 to devices 150 and 160. Control $\mu$C 100 may be a microprocessor such as the MC68HC05 from Motorola. Devices 150 and 160 represent one or more types of signal or data processing devices that may be digital or analog integrated circuits (IC's). The operation of these devices is controlled via the serial data bus using the Inter IC (IIC) bus protocol for device 150 and the Intermetall (IM) bus protocol for device 160. For example, in a video signal processor such as the CTC-169 color television chassis from Thomson Consumer electronics, device 150 represents IC's such as Microchip 24C02 (EEPROM), Motorola MC44802 (tuning processor), and Philips 8444 (digital-to-analog converter (DAC)). In the same video signal processor example, device 160 represents IC's such as the Thomson 1A68109 (Proscan processor), Thomson 1A68106 (stereo processor), and Thomson 1A68105 (picture-in-picture (PIP) processor).

Figure 2:
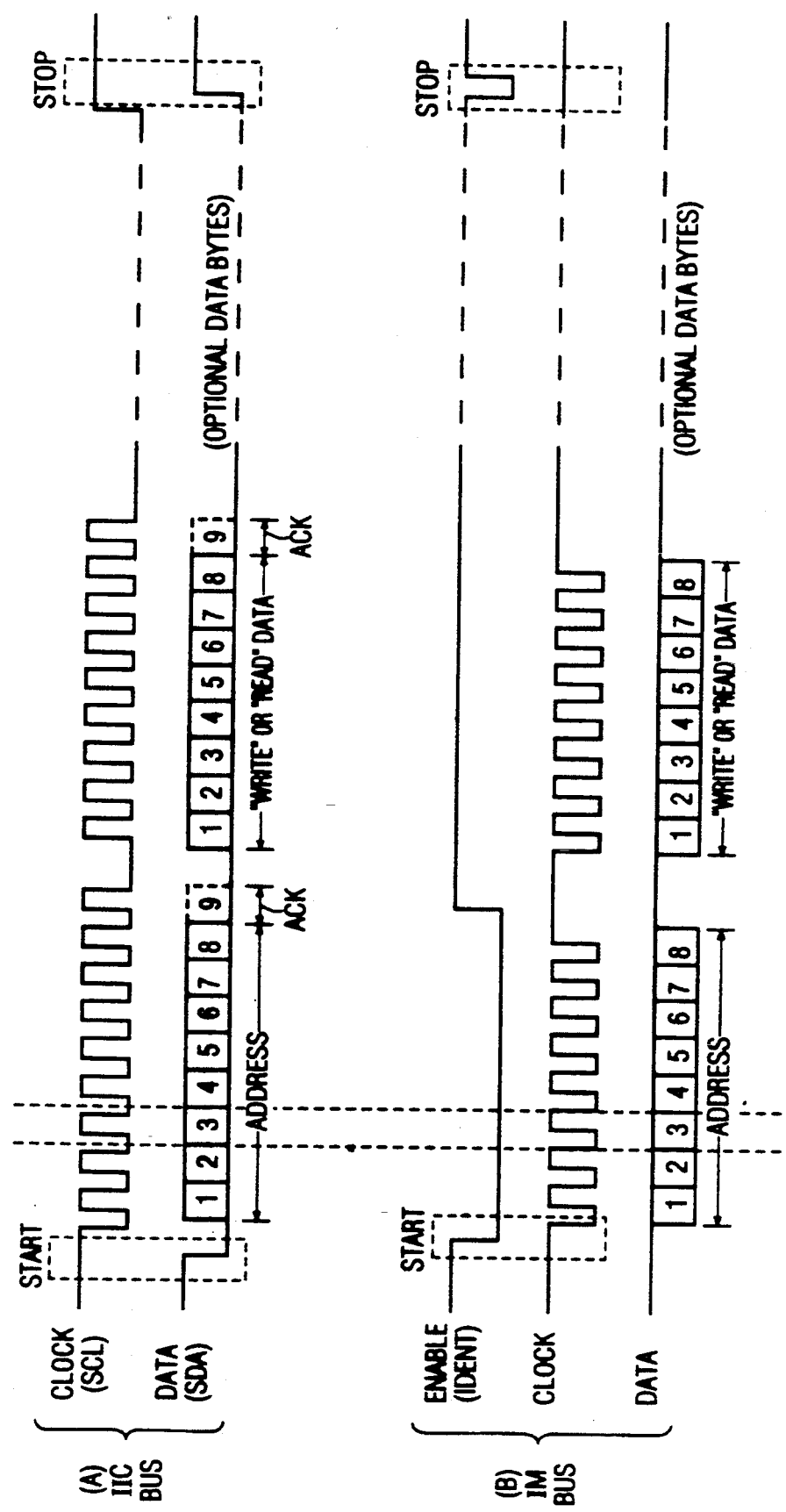

FIG. 2 illustrates the bus signal format for both the IIC and IM bus protocols. As shown in FIG. 2, communications in IIC format requires signal SCL, a clock signal, and signal SDA, a data signal. When an IIC bus is inactive, signals SCL and SDA should be at logic 1. A "message start" condition occurs when signal SDA goes to logic 0 during the time that signal SCL is at logic 1. The start condition is followed by a "start bit", an 8-bit device address, and an acknowledge bit that is used to acknowledge receipt of the address. The address acknowledge bit is followed by 8 bits (one byte) of data and data acknowledge bit. The address and data in IIC format is transmitted most significant bit (MSB) first. Additional bytes of data with corresponding data acknowledge bits may follow before a "message stop" or "end of transmission" (EOT) condition terminates the message. The EOT condition occurs when a logic 0 to logic 1 transition occurs on signal SDA when signal SCL is at logic 1.

The IM bus protocol shown in FIG. 2 requires three signals designated IDENT, an enable signal, CLOCK, and DATA. For the IM bus protocol, a "message start" is indicated by a transition on signal IDENT to logic 0 followed by a transition on signal CLOCK to a logic 0. "Message start" is followed by an 8-bit address and 8 bits of data. The address and data in IM format is transmitted least significant bit (LSB) first. Signal IDENT changes to logic 1 after all address bits are transmitted to cause each IM device that is attached to the bus to compare the transmitted address to the device address.

No acknowledge bits are included. Additional bytes of data may follow the initial byte. "Message stop" or EOT is indicated by a pulse on signal IDENT.

Figure 1A:
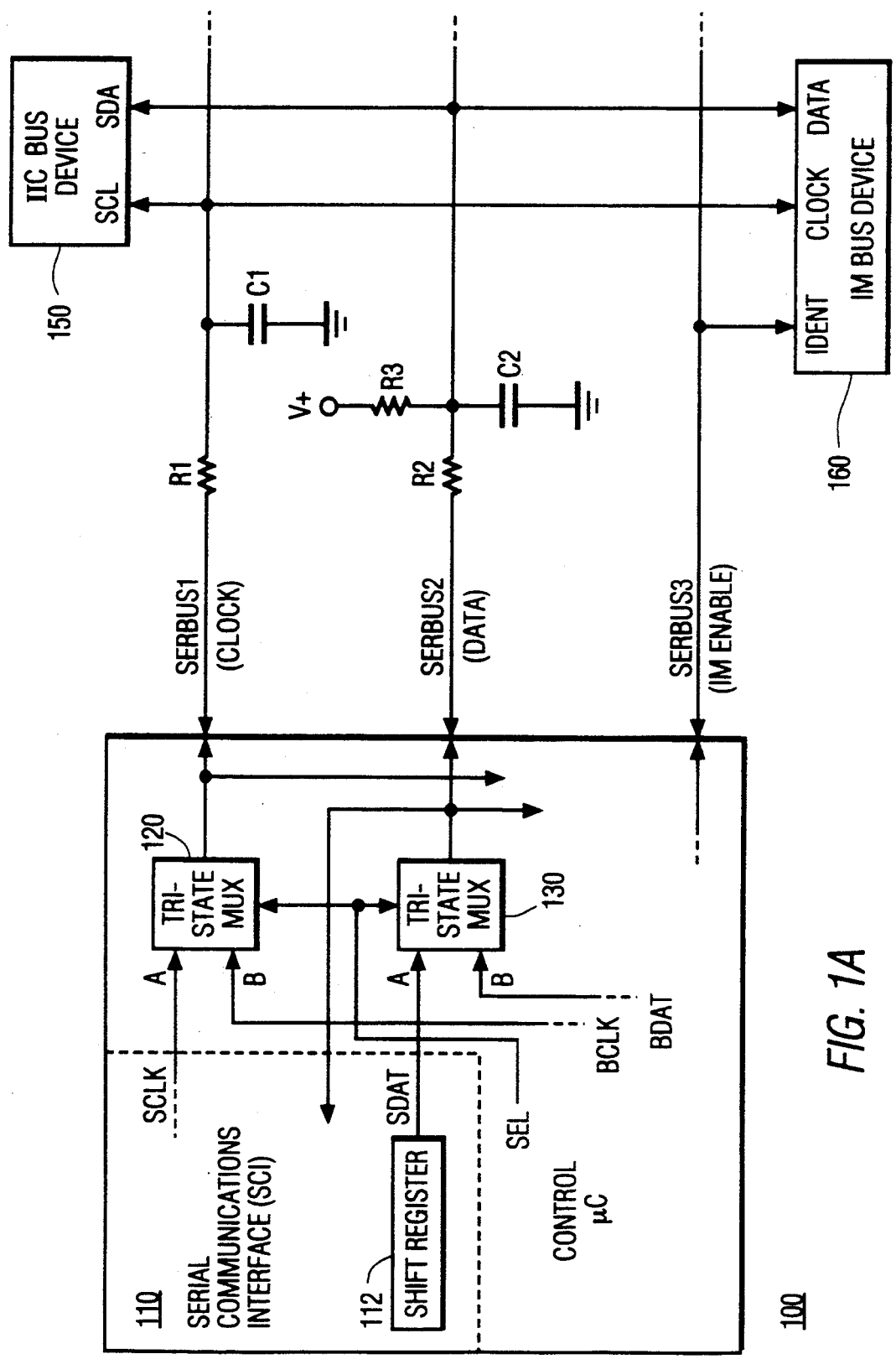
FIG. 1A shows a block diagram of a portion of a bus-controlled signal processing system that exhibits bus conflict problems that may be solved by the invention.

In the system shown in FIG. 1, signals IDENT, CLOCK, and DATA of IM bus protocol IC's such as device 160 in FIG. 1 are coupled to signals SERBUS3, SERBUS1, and SERBUS2, respectively, from μC 100 in FIG. 1. This arrangement appears to define signals SERBUS1 and SERBUS2 as clock and data signals, respectively. It would appear, therefore, that signals SCL and SDA (clock and data, respectively) of IIC protocol devices such as device 150 should be connected to serial bus signals SERBUS1 and SERBUS2, respectively, as shown in FIG. 1A. However, in accordance with a feature of the present invention, signals SCL and SDA are coupled to signals SERBUS2 and SERBUS1, respectively, as shown in FIG. 1. This surprising arrangement advantageously prevents bus conflict problems as described below.

In the exemplary embodiment shown in FIG. 1, control μC 100 generates both IIC and IM format messages for purposes of communicating with both IIC devices, e.g. device 150, and IM devices, e.g. device 160. Control μC 100 accomplishes this through the use of two modes of operation that are designated "shift-register" mode and "bit-bang" mode. Shift-register mode is used to produce IM format signals while bit-bang mode produces IIC format signals.

In shift-register mode, IM format serial data (IM signal DATA on bus line SERBUS2) is generated using 8-bit shift register 112 in FIG. 1. Shift register 112 is part of dedicated serial communications interface (SCI) 110 that is in μC 100. As can be seen from FIG. 2, the IM format data signal has uniform 8-bit groupings of data values. Thus, an 8-bit shift register provides an efficient approach to generating the 8-bit serial data signal for IM format. For example, when a transmission from μC 100 to a device such as device 160 is to occur, μC 100 loads the 8-bit address byte into 8-bit shift register 112 and shifts each bit out onto bus line SERBUS2 via signal SDAT to produce the 8-bit address portion of an IM format message. Transmission of the address is followed by loading an 8-bit data byte into shift register 112 and shifting the 8-bits of data onto bus line SERBUS2.

FIG. 2 illustrates that the IIC bus protocol requires a data signal (signal SDA) having an irregular waveform in comparison to the IM protocol waveform. More specifically, a start bit, 8-bits of address or data, and acknowledge bits are required. The 8-bit size limitation of shift register 112 prevents efficient generation of the irregular sequences required by the IIC data signal. As a result, the 9-bit sequences are generated in μC 100 via software routines that are executed during "bit-bang" mode. Bit-bang operations involve using the internal registers and data manipulation functions of μC 100 to produce the required serial bit patterns on signal BDAT one bit at a time. For example, signal BDAT may be coupled to one bit of an internal register. Instructions that load, shift, and perform logical operations on the content of the internal register may be used to change the value of signal BDAT to provide the desired serial data sequence.

It should be noted that bit-bang mode could be used to generate serial data signals suitable for both IM and IIC formats. However, shift register 112 can produce a serial data signal at a significantly higher data rate than can bit-bang operation because of the software execution delays involved in bit-bang processing. It is desirable, therefore, to use shift-register mode when possible.

In FIG. 1, tristate MUX's 120 and 130 are included in μC 100 for switching between shift-register and bit-bang modes of operation. The MUX switching is controlled by μC 100 via a control signal SEL that is coupled to MUX 120 and MUX 130. The control signal causes MUX 120 and MUX 130 to couple signals SCLK and SDAT from SCI 110 to serial bus lines SERBUS1 and SERBUS2, respectively, via the "A" inputs of MUX's 120 and 130 during serial shift mode. As a result, IM bus signals CLOCK and DATA corresponding to signals SCLK and SDAT, respectively, are produced on serial bus lines SERBUS1 and SERBUS2, respectively. During bit-bang mode, signals BDAT and BCLK are generated in μC 100 and are coupled to serial bus lines SERBUS1 and SERBUS2, respectively, via the "B" inputs of the MUX 120 and MUX 130. Thus, IIC bus signals SDA and SCL corresponding to signals BDAT and BCLK, respectively, are produced on serial bus lines SERBUS1 and SERBUS2, respectively. Bus line SERBUS3 is the enable signal IDENT for IM format devices only and is not switched when mode changes occur.

The tristate feature of MUX 120 and MUX 130 permits bidirectional operation on bus lines SERBUS1 and SERBUS2. Control μC 100 controls the operation of the tristate feature of MUX's 120 and 130 in accordance with whether a particular serial bus operation involves writing data to a device from μC 100 or reading data into μC 100 from a device.

As FIG. 1 and Table 1 show, the action of MUX 120 and MUX 130 causes the function of bus lines SERBUS1 and SERBUS2 to reverse when switching from serial-shift mode (IM format messages) to bit-bang mode (IIC format messages).

TABLE 1

| Mode/Format | SERBUS1 coupled to | SERBUS1 function | SERBUS2 coupled to | SERBUS2 function |
|---|---|---|---|---|
| shift-reg./IM | SCLK | clock | SDAT | data |
| bit-bang/IIC | BDAT | data | BCLK | clock |

Typically, the function of a bus line in a signal processing system does not switch between clock and data functions. The advantageous performance of the described arrangement is better understood after considering the following detailed explanation of possible causes of the above-described bus conflict problem.

For the purposes of illustrating bus conflict situations, the following discussion will refer to FIG. 1A in which signals SCL of IIC devices and CLOCK of IM devices are connected to serial bus line SERBUS1, and signals SDA and DATA are both connected to serial bus line SERBUS2. Thus, bus line SERBUS1 always provides a clock signal and bus line SERBUS2 always provides a data signal. As a result, the arrangement in FIG. 1A also includes signals SDAT from SCI 110 and bit-bang generated signal BDAT both being coupled to MUX 130, and signals SCLK and BCLK both being connected to MUX 120.

Figure 3:
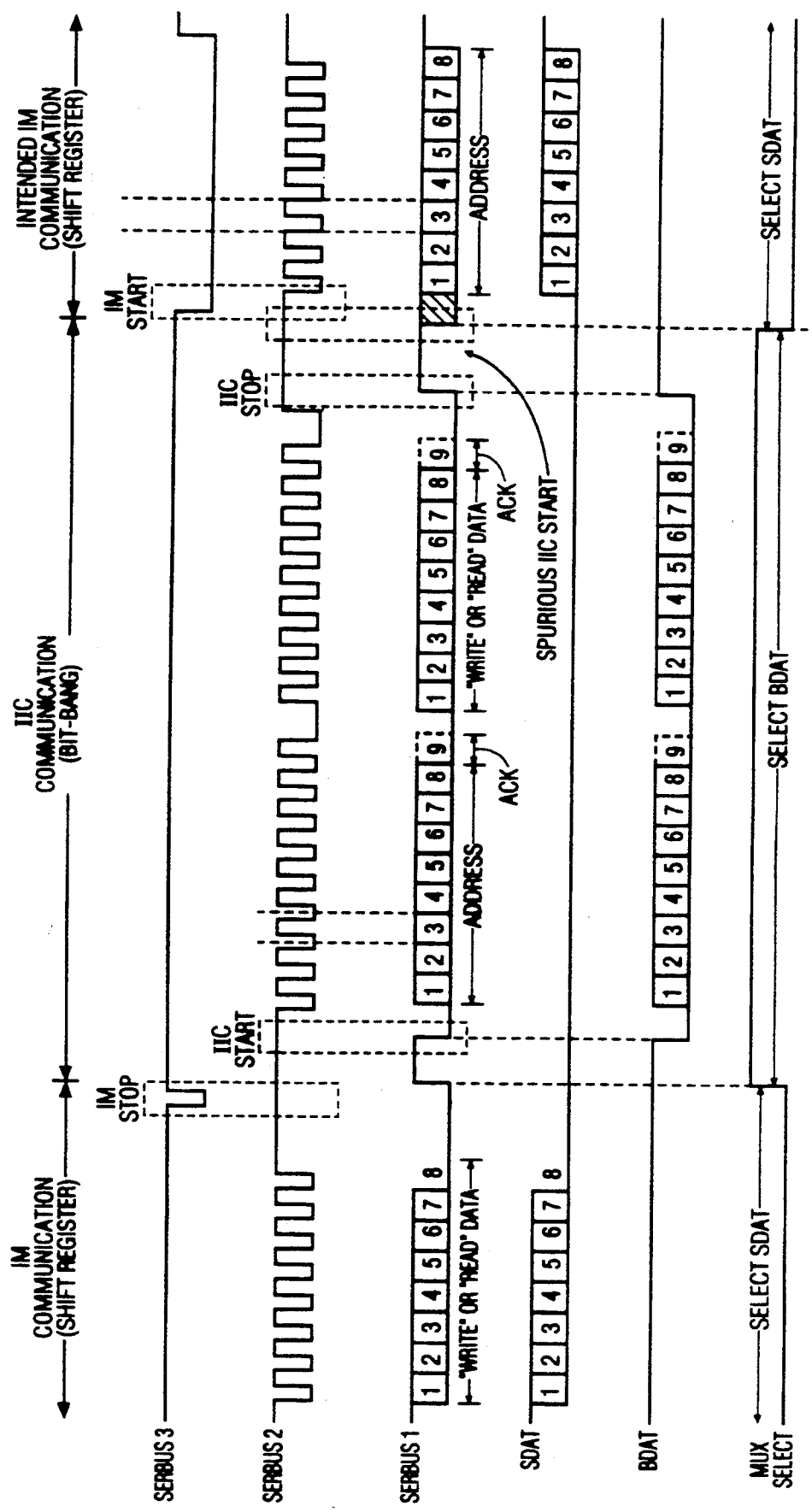

FIG. 3 depicts a bus conflict problem that may occur in the system shown in FIG. 1A when an IIC format transmission is followed by an IM format transmission. A sequence of transmissions comprising an IM transmission, an IIC format transmission, and another IM format transmission are shown in FIG. 3. During the first IM transmission, signal SDAT is coupled to SERBUS2 and has the values shifted out of shift-register 112. During the following IIC transmission, MUX 130 couples signal BDAT to bus line SERBUS2 while signal SDAT retains the last value that was shifted out of shift register 112. In the example of FIG. 3, the last value of signal SDAT is logic 0. At the end of the IIC transmission, the value of signal BDAT is set to logic 1 to produce an EOT condition and put the bus into an inactive condition.

At the start of the subsequent IM transmission, MUX 130 is switched to couple signal SDAT to bus line SERBUS2. The switching of MUX 130 will cause serial bus line SERBUS2 to go from the inactive state of logic 1 to the logic 0 value of signal SDAT from the previous IM transmission. Unequal signal delays between bus lines SERBUS1 and SERBUS2 may cause the timing of the transition of bus line SERBUS2 from logic 1 to logic 0 to vary with respect to changes on bus line SERBUS1. This timing variation is illustrated by the shaded area of signal SERBUS2 in FIG. 3. Unequal delays may be caused by, for example, unequal parasitic resistance and capacitance effects. These parasitic elements are indicated by resistors R1 and R2, and capacitors C1 and C2 in FIGS. 1 and 1A. Resistor R3 is a pullup device that may be required for IIC data lines because the bus line drivers in IIC devices is typically an open-collector configuration. Typical values for R1 and R3 are 1 KΩ and 10 KΩ, respectively.

If the transition to logic 0 on bus line SERBUS2 occurs while signal SERBUS1 is at logic 1, a spurious start condition for IIC devices is created during an IM transmission as indicated in FIG. 3. Thus, both IIC and IM devices detect a start condition. As stated above, the bit significance of the serial data bits in IIC transmissions is reversed from that of IM transmissions (LSB first for IM, MSB first for IIC). Thus, the address information that is intended for an IM device during the intended IM transmission may also represent a valid address for an IIC device even if the two devices are not assigned the same address. Thus, the spurious IIC start condition and the valid IM start condition may simultaneously activate an IIC device and an IM device. An active IIC device will respond to a valid address with an acknowledge bit that may corrupt the IM data signal.

By reversing the function of bus lines in accordance with features of the present invention as described above and shown in FIG. 1, MUX switching at the beginning of IM transmissions to place signal SDAT on to bus line SERBUS2 causes any resulting transitions of signal SERBUS2 to be coupled to the clock input (SCL) of IIC devices, as in FIG. 1, rather than the data input (SDA) as in FIG. 1A. Thus, the spurious start condition illustrated in FIG. 3 will not occur.

It might appear that a similar problem could occur because the bus line functions are reversed. For example, referring to FIG. 3, if the first one or more address bits of the IM device address are logic 1 in the second IM transmission, IM data signal DATA on bus line SERBUS2 will remain at logic 1 while IM clock signal CLOCK on SERBUS1 is changing. Thus, IIC clock signal SCL (on bus line SERBUS2) will remain at logic 1 while IIC data signal SDA (on bus line SERBUS1) is changing. This condition creates a sequence of IIC start conditions. However, each start condition is followed by an IIC stop condition or EOT because the IM clock signal on SERBUS1 returns to logic 1 immediately following each transition to logic 0. As a result, the IIC devices do not receive a full 8 bits of address and cannot generate a spurious acknowledge bit that might corrupt the IM transmission.

A bus conflict may also occur when IM format messages are transmitted repeatedly. FIG. 4A shows the end of one IM format message (indicated by the "stop" or "end of transmission" (EOT) pulse), and the beginning of another IM message. At the end of one message, IM signals CLOCK and DATA (bus lines SERBUS1 and SERBUS2, respectively, in FIG. 1A) are forced to logic 1 which is the inactive state. As shown in FIG. 4A, signal DATA begins to change to logic 1 after signal CLOCK has already changed to logic 1. The time delay between the transitions of signals CLOCK and DATA that is shown in FIG. 4A may be caused by unequal parasitic loading of the serial bus lines as described above. After passing logic switching threshold VT, signal DATA is effectively at logic 1. However, transient signals, e.g. noise, may cause a negative-going spike in signal DATA that occurs before signal DATA completes its transition to logic 1 but after signal DATA has passed threshold VT. Thus, signal DATA would appear to exhibit a pulse to logic 0 while signal CLOCK is at logic 1. If the pulse is of sufficient duration and the system is connected as shown in FIG. 1A, a spurious IIC start condition is created.

FIG. 4B illustrates another potential cause of bus conflicts that might occur during a sequence of IM format messages in a system connected as in FIG. 1A. The system shown in FIG. 1 might be designed such that any "forced" state on signals CLOCK and DATA at the end of an IM transmission, e.g. forced to logic 1, is "released" into a tristate (high impedance) condition at the end of the IM transmission to prevent the forced state from interfering with subsequent bus transmissions. However, the tristate condition permits leakage currents to cause a relatively slow change in the value of signal DATA as shown in FIG. 4B. If the high impedance condition exists for a sufficient duration, the change in the value of signal DATA (bus line SERBUS2) may be cross switching threshold VT effectively changing the state of signal DATA to logic 0. If signal CLOCK (bus line SERBUS1) is at logic 1 when the change of state occurs, a spurious IIC start condition exists in a system that is connected as in FIG. 1A.

The potential problems that are illustrated in FIGS. 4A and 4B are eliminated by switching the function of the bus lines in accordance with features of the present invention. As explained above in regard to FIG. 3, switching the function of the bus lines as in FIG. 1 prevents the described spurious transitions from occurring on signal SDA of IIC devices, thereby preventing a spurious IIC start condition from occurring in the described situations.

What is claimed is:

1. Apparatus comprising:
   a data bus comprising a first bus line and a second bus line;
   first means having a first clock input and a first data input coupled to said first and said second bus lines, respectively, for providing a first data processing operation in response to a first clock signal and a first data signal received at said first clock input and said first data input, respectively;
   second means having a second clock input and a second data input coupled to said second and said first bus lines, respectively, for providing a second data processing operation in response to a second clock signal and a second data signal received at said second clock input and said second data input, respectively; and control means for generating said first clock signal and said first data signal during a first mode of operation, and for generating said second data signal and said second clock signal during a second mode of operation, and for generating a control signal indicating whether said control means is in said first or said second mode of operation;

said control means including a switch responsive to said control signal for exchanging the function of said first and said second bus lines by coupling said first clock signal and said first data signal to said first and second bus lines, respectively, during said first mode of operation to control said first data processing operation without affecting said second data processing operation, and by coupling said second clock, signal and said second data signal to said second and said first bus lines, respectively, during said second mode of operation to control said second data processing operation without affecting said first data processing operation.

2. The apparatus of claim 1, wherein said control means comprises:

a microprocessor for generating said first data signal during said first mode of operation; and a shift register for generating said second data signal during said second mode of operation;

said switch coupling said first data signal from said microprocessor to said second bus line during said first mode of operation, and coupling said second data signal from said shift register to said first bus line during said second mode of operation.

3. The apparatus of claim 2, wherein said data bus is a serial data bus and said first and said second data signals are serial data signals.

4. The apparatus of claim 3, wherein said first clock signal and said first data signal are generated by said control means during said first mode of operation according to an Intermetall (IM) serial bus protocol, and said second clock signal and said second data signal are generated by said control means during said second mode of operation according to an Inter IC (IIC) serial bus protocol.

5. Apparatus comprising:

a data bus comprising a first signal path and a second signal path;

first means coupled to said first and said second signal paths for processing data in response to signals exhibiting a first format received via said first and said second signal paths;

second means coupled to said first and said second signal paths for processing data in response to signals exhibiting a second format received via said first and said second signal paths; and control means coupled to said data bus for generating a clock signal and a data signal during each of a first mode of operation and a second mode of operation, said clock signal and said data signal exhibiting said first format during said first mode and exhibiting said second format during said second mode, and for generating a control signal indicating whether said control means is operating in said first mode or in said second mode;

said control means including a switch responsive to said control signal for exchanging the function of said first and second signal paths by coupling said clock signal and said data signal during said first mode to said first and said second signal paths, respectively, and by coupling said clock signal and said data signal during said second mode to said second and said first signal paths, respectively.

6. The apparatus of claim 5, wherein said control means comprises:

a microprocessor for generating said data signal during said first mode of operation at an output of said microprocessor; and a shift register for generating said data signal during said second mode of operation at an output of said shift register;

said switch coupling said data signal during said first mode of operation from said output of said microprocessor to said second signal path, and coupling said data signal during said second mode of operation from said shift register to said first signal path.

7. The apparatus of claim 5 or claim 6, wherein said data bus is a serial data bus and said data signal is a serial data signal including data intervals defined by said clock signal.

8. The apparatus of claim 7, wherein said first format comprises an Intermetall (IM) serial bus protocol and said second format comprises an Inter IC (IIC) serial bus protocol.

* * * * *